(12) United States Patent  
Nakamura et al.

(10) Patent No.: US 12,012,087 B2  
(45) Date of Patent: Jun. 18, 2024

(54) BRAKE HYDRAULIC PRESSURE CONTROL DEVICE, SADDLE-TYPE VEHICLE, AND BRAKE HYDRAULIC PRESSURE CONTROL METHOD

(71) Applicant: Robert Bosch GmbH, Stuttgart (DE)

(72) Inventors: Atsushi Nakamura, Kanagawa (JP); Shunsaku Ono, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 871 days.

(21) Appl. No.: 17/059,673

(22) PCT Filed: May 14, 2019

(86) PCT No.: PCT/IB2019/053981  
§ 371 (c)(1),  
(2) Date: Nov. 30, 2020

(87) PCT Pub. No.: WO2019/229567  
PCT Pub. Date: Dec. 5, 2019

(65) Prior Publication Data  
US 2021/0206359 A1    Jul. 8, 2021

(30) Foreign Application Priority Data  
May 31, 2018    (JP) .................................. 2018-104612

(51) Int. Cl.  
*B60T 8/1761*    (2006.01)  
*B60T 8/17*      (2006.01)  
(Continued)

(52) U.S. Cl.  
CPC ........ *B60T 8/17616* (2013.01); *B60T 8/1706* (2013.01); *B60T 8/261* (2013.01);  
(Continued)

(58) Field of Classification Search  
CPC ............... B60T 13/142; B60T 2250/04; B60T 2270/10; B60T 8/1706; B60T 8/17616;  
(Continued)

(56) References Cited

U.S. PATENT DOCUMENTS

2009/0055066 A1* 2/2009 Ono ........................ B60T 8/261  
701/70

FOREIGN PATENT DOCUMENTS

EP    1980461 A1    10/2008  
EP    1982884 A1    10/2008  
(Continued)

OTHER PUBLICATIONS

International Search Report and Written Opinion for Application No. PCT/IB2019/053981 dated Oct. 7, 2019 (10 pages).

*Primary Examiner* — Charles J Han  
(74) *Attorney, Agent, or Firm* — Michael Best & Friedrich LLP

(57) ABSTRACT

Examples herein include a brake hydraulic pressure control device and a brake hydraulic pressure control method capable of preventing a rear wheel of a saddle-type vehicle from lifting. The brake hydraulic pressure control device of a saddle-type vehicle is configured to execute anti-lock brake control and determine an opening time of one opening of a hydraulic pressure adjusting valve, and control the hydraulic pressure adjusting valve to repeatedly open for the opening time and close a main flow path, causing a brake fluid to flow from a master cylinder to a wheel cylinder. A pressure of the brake fluid in the wheel cylinder is increased after a decrease in the pressure of the brake fluid in the wheel cylinder during the anti-lock brake control. The opening time is determined according to the pressure of the brake fluid in the master cylinder and the input gradient of the brake lever.

10 Claims, 4 Drawing Sheets

(51) Int. Cl.
  *B60T 8/26* (2006.01)
  *B60T 8/32* (2006.01)
  *B60T 13/14* (2006.01)
  *B62K 11/00* (2006.01)
  *B62L 3/02* (2006.01)
  *B62M 6/40* (2010.01)

(52) U.S. Cl.
  CPC .......... *B60T 8/3225* (2013.01); *B60T 13/142* (2013.01); *B62L 3/023* (2013.01); *B60T 2250/04* (2013.01); *B60T 2270/10* (2013.01); *B62K 11/00* (2013.01); *B62M 6/40* (2013.01)

(58) Field of Classification Search
  CPC ....... B60T 8/261; B60T 8/3225; B62K 11/00; B62L 3/023; B62M 6/40
  See application file for complete search history.

(56) References Cited

FOREIGN PATENT DOCUMENTS

| | | |
|---|---|---|
| EP | 2003033 A1 | 12/2008 |
| EP | 2489564 A1 | 10/2010 |
| JP | 2015085898 A | 5/2015 |

\* cited by examiner

BRAKE HYDRAULIC PRESSURE CONTROL DEVICE, SADDLE-TYPE VEHICLE, AND BRAKE HYDRAULIC PRESSURE CONTROL METHOD

BACKGROUND OF THE INVENTION

The present invention relates to a brake hydraulic pressure control device of a saddle-type vehicle configured to execute anti-lock brake control, a saddle-type vehicle including the brake hydraulic pressure control device, and a brake hydraulic pressure control method of a saddle-type vehicle for executing anti-lock brake control.

In the related art, a brake hydraulic pressure control device has been known which is mounted to a saddle-type vehicle and executes anti-lock brake control to prevent a wheel from locking when an input unit of a brake such as a brake lever is operated (for example, refer to JP-A-2015-085898). During the anti-lock brake control, the brake hydraulic pressure control device increases and decreases a pressure of a brake fluid in a wheel cylinder to prevent the wheel from locking while the input unit of the brake is operated.

SUMMARY OF INVENTION

The brake hydraulic pressure control device of a saddle-type vehicle includes a hydraulic pressure adjusting valve configured to repeatedly open and close a main flow path through which a brake fluid to be supplied from a master cylinder to the wheel cylinder is to flow. When increasing the pressure after decreasing the pressure of the brake fluid in the wheel cylinder during the anti-lock brake control, the brake hydraulic pressure control device of a saddle-type vehicle repeatedly opens and closes the hydraulic pressure adjusting valve. Thereby, when the hydraulic pressure adjusting valve is in an open state, a predetermined amount of the brake fluid is repeatedly supplied to the wheel cylinder, so that the pressure of the brake fluid in the wheel cylinder is increased. At this time, according to the brake hydraulic pressure control device of a saddle-type vehicle of the related art, a time for one opening of the hydraulic pressure adjusting valve is determined as follows.

Specifically, the brake hydraulic pressure control device of a saddle-type vehicle of the related art acquires a pressure of the brake fluid in the master cylinder at the time of timing at which the decrease in pressure of the brake fluid in the wheel cylinder starts during the anti-lock brake control. For example, the brake hydraulic pressure control device of a saddle-type vehicle of the related art calculates a pressure of the brake fluid in the master cylinder from a deceleration of a wheel. Then, when increasing the pressure after decreasing the pressure of the brake fluid in the wheel cylinder during the anti-lock brake control, the brake hydraulic pressure control device of a saddle-type vehicle of the related art determines, based on the pressure of the brake fluid in the master cylinder acquired as described above, a time for one opening of the hydraulic pressure adjusting valve so that a prescribed amount of the brake fluid is to be supplied to the wheel cylinder during the time for one opening of the hydraulic pressure adjusting valve. For example, the brake hydraulic pressure control device of a saddle-type vehicle of the related art obtains a differential pressure by subtracting a pressure of the brake fluid in the wheel cylinder at the present moment from the pressure of the brake fluid in the master cylinder acquired as described above. Then, the brake hydraulic pressure control device of a saddle-type vehicle of the related art determines how long the hydraulic pressure adjusting valve is to be opened at the differential pressure so as to supply a prescribed amount of the brake fluid to the wheel cylinder, thereby determining a time for one opening of the hydraulic pressure adjusting valve.

As described above, the brake hydraulic pressure control device of a saddle-type vehicle of the related art determines the time for one opening of the hydraulic pressure adjusting valve upon the increase in pressure, based on the pressure of the brake fluid in the master cylinder acquired at a point of time at which the decrease in pressure of the brake fluid in the wheel cylinder starts during the anti-lock brake control. For this reason, when the decrease in pressure of the brake fluid in the wheel cylinder starts during the anti-lock brake control while an operating amount on the input unit of a brake is increasing (for example, while the brake lever is being gripped), for example, the acquired pressure of the brake fluid in the master cylinder may be smaller than an actual pressure of the brake fluid in the master cylinder at the time when opening the hydraulic pressure adjusting valve upon the increase in pressure.

In this case, the brake fluid more than the prescribed amount is supplied to the wheel cylinder during the time for one opening of the hydraulic pressure adjusting valve, so that the pressure of the brake fluid in the wheel cylinder may be rapidly increased. If the pressure of the brake fluid in the wheel cylinder of a front wheel is rapidly increased, the front wheel locks, so that a rear wheel lifts, i.e., so-called rear wheel lifting occurs.

The present invention has been made in view of the above situations, and an object thereof is to provide a brake hydraulic pressure control device of a saddle-type vehicle configured to execute anti-lock brake control and capable of preventing a rear wheel from lifting, in contrast to the related art. Also, the present invention is to provide a saddle-type vehicle including the brake hydraulic pressure control device. Also, the present invention has been made in view of the above situations, and is to provide a brake hydraulic pressure control method of a saddle-type vehicle configured to execute anti-lock brake control and capable of preventing a rear wheel from lifting, in contrast to the related art.

Solution to Problem

According to the present invention, there is provided a brake hydraulic pressure control device of a saddle-type vehicle, configured to execute anti-lock brake control of decreasing and increasing a pressure of a brake fluid in a wheel cylinder in correspondence to a wheel slip state while an input unit of a brake is operated, the brake hydraulic pressure control device including: a master cylinder-side pressure acquisition unit configured to acquire a pressure of a brake fluid in a master cylinder; an input gradient acquisition unit configured to acquire an input gradient, which is an increment per unit time of the amount of operation of the input unit; an open time determination unit configured to determine the time for one opening of a hydraulic pressure adjusting valve configured to repeatedly open and close a main flow path, through which a brake fluid to be supplied from the master cylinder to the wheel cylinder is to flow, while the pressure of the brake fluid in the wheel cylinder is increased after the pressure of the brake fluid in the wheel cylinder is decreased during the anti-lock brake control; and an execution unit configured to open and close the hydraulic pressure adjusting valve, wherein the open time determination unit is configured to determine the time for one opening of the hydraulic pressure adjusting valve in correspondence to the pressure of the brake fluid in the master cylinder and the input gradient of the input unit.

According to the present invention, there is also provided a saddle-type vehicle including the brake hydraulic pressure control device of the present invention.

Also, a brake hydraulic pressure control method of the present invention is a brake hydraulic pressure control method of a saddle-type vehicle of executing anti-lock brake control of decreasing and increasing a pressure of a brake fluid in a wheel cylinder in correspondence to a wheel slip state while an input unit of a brake is operated, and includes a master cylinder-side pressure acquisition step of acquiring a pressure of a brake fluid in a master cylinder, an input gradient acquisition step of acquiring an input gradient, which is an increment per unit time of the amount of operation of the input unit, an open time determination step of determining the time for one opening of a hydraulic pressure adjusting valve configured to repeatedly open and close a main flow path, through which a brake fluid to be supplied from the master cylinder to the wheel cylinder is to flow, while increasing a pressure of the brake fluid in the wheel cylinder after decreasing the pressure of the brake fluid in the wheel cylinder during the anti-lock brake control, and an execution step of opening and closing the hydraulic pressure adjusting valve, wherein the open time determination step is to determine the time for one opening of the hydraulic pressure adjusting valve in correspondence to the pressure of the brake fluid in the master cylinder and the input gradient of the input unit.

Advantageous Effects of Invention

According to the present invention, when increasing the pressure after decreasing the pressure of the brake fluid in the wheel cylinder during the anti-lock brake control, the time for one opening of the hydraulic pressure adjusting valve is determined on the basis of the pressure of the brake fluid in the master cylinder and the input gradient, which is an increment per unit time of the amount of operation of the input unit of a brake. For this reason, as compared to the related art, according to the present invention, it is possible to prevent more than a prescribed amount of the brake fluid from being supplied to the wheel cylinder during the time for one opening of the hydraulic pressure adjusting valve, so that it is possible to prevent the pressure of the brake fluid in the wheel cylinder from rapidly increasing. Therefore, when the present invention is used for braking control of a front wheel of the saddle-type vehicle, it is possible to prevent a rear wheel from lifting, in contrast to the related art.

DETAILED DESCRIPTION

Figure 1:
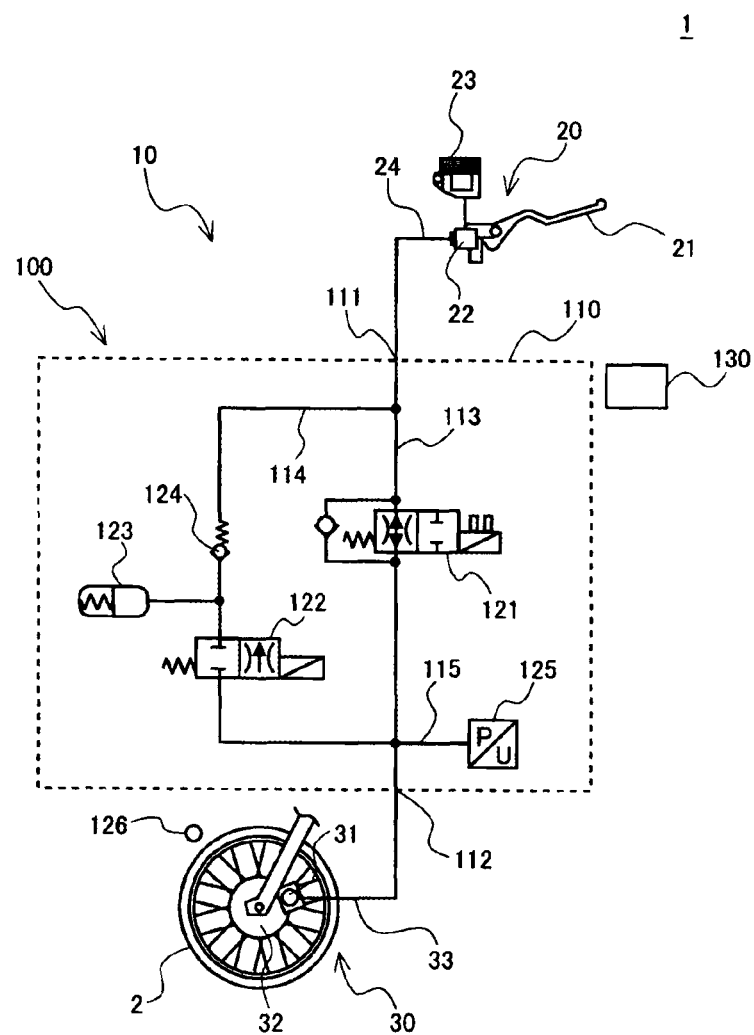
FIG. 1 illustrates a schematic configuration of a brake system according to a first embodiment of the present invention.

Hereinafter, a first embodiment of the present invention will be described with reference to the drawings.

In the below, an example where the present invention is adopted for a bicycle (for example, a two-wheeled vehicle, a three-wheeled vehicle and the like) is described. However, the present invention can be adopted for other saddle-type vehicles rather than the bicycle. The other saddle-type vehicles rather than the bicycle include an automatic two-wheeled vehicle, an automatic three-wheeled vehicle, a buggy and the like in which at least one of an engine and an electric motor is used as a drive source, for example. That is, the present invention can be adopted for an electric saddle-type vehicle in which an electric motor is used as a drive source, too. In the meantime, the bicycle means a general vehicle capable of traveling on a road by a depression force to be applied to a pedal. That is, the bicycle includes a usual bicycle, an electric assist bicycle, an electric bicycle and the like. Also, an automatic two-wheeled vehicle or an automatic three-wheeled vehicle means a so-called motorcycle, and the motorcycle includes an automatic bicycle, a scooter, an electric scooter and the like.

Also, the configurations, operations and the like to be described later are exemplary, and the present invention is not limited to the configurations, operations and the like.

Also, in the respective drawings, the same or equivalent members or parts are denoted with the same reference numerals or the reference numerals are omitted. Also, in the respective drawings, the detailed illustrations are simplified or omitted.

First Embodiment

In the below, a brake hydraulic pressure control device according to the first embodiment, a saddle-type vehicle according to the first embodiment, and a brake hydraulic pressure control method according to the first embodiment are described.

<Configuration of Brake System>

A configuration of a brake system mounted to the bicycle according to the first embodiment is described.

FIG. 1 illustrates a schematic configuration of the brake system according to the first embodiment of the present invention. Meanwhile, in FIG. 1, the constitutional elements, which relate to braking of a rear wheel, of a brake system 10 mounted to a bicycle 1 are not shown.

As shown in FIG. 1, the bicycle 1 that is an example of the saddle-type vehicle includes the brake system 10. The brake system 10 is to control a hydraulic pressure of a brake fluid in a wheel cylinder 31 of a front wheel 2, i.e., a braking force of the front wheel 2. The brake system 10 includes a braking operation unit 20, a front wheel braking unit 30, and a brake hydraulic pressure control device 100.

The brake hydraulic pressure control device 100 includes a base body 110 that is to be described in detail later. The base body 110 is formed with a master cylinder port 111 and a wheel cylinder 112.

The braking operation unit 20 includes a brake lever 21, which is an example of an input unit of the brake, a master cylinder 22, a reservoir 23, and a fluid pipe 24. The master cylinder 22 includes a piston unit (not shown) that is to move in conjunction with a passenger's operation on the brake lever 21. In the reservoir 23, a brake fluid in the master cylinder 22 is accumulated under atmospheric pressure. One end of the fluid pipe 24 is connected to the master cylinder 22, and the other end of the fluid pipe 24 is connected to the master cylinder port 111.

The front wheel braking unit 30 includes a wheel cylinder 31, a brake disc 32, and a fluid pipe 33. The wheel cylinder 31 includes a piston unit (not shown) that is to move in conjunction with a change in hydraulic pressure of the brake fluid in the fluid pipe 33 connected to the wheel cylinder port 112. The brake disc 32 is mounted to the front wheel 2 and is configured to rotate together with the front wheel 2. By movement of the piston unit of the wheel cylinder 31, a brake pad (not shown) is pressed to the brake disc 32, so that the front wheel 2 is braked.

The brake hydraulic pressure control device 100 includes the base body 110, a first hydraulic pressure adjusting valve 121, a second hydraulic pressure adjusting valve 122, an accumulator 123, a check valve 124, a hydraulic pressure detector 125, a wheel speed detector 126, and a control unit 130.

The base body 110 is formed with a main flow path 113, a sub-flow path 114, and a flow path 115, as an internal flow path.

In the example of FIG. 1, the main flow path 113 is formed to allow the master cylinder port 111 and the wheel cylinder port 112 to communicate with each other therebetween. That is, the master cylinder 22 and the wheel cylinder 31 are configured to communicate with each other by the fluid pipe 24, the main flow path 113 and the fluid pipe 33. In other words, the main flow path 113 is a flow path through which the brake fluid to be supplied from the master cylinder 22 to the wheel cylinder 31 is to flow. In the meantime, the master cylinder 22 and the master cylinder port 111 may be directly connected without the fluid pipe 24, and the wheel cylinder 31 and the wheel cylinder port 112 may be directly connected without the fluid pipe 33.

Also, in the example of FIG. 1, the sub-flow path 114 is formed to bypass a partial region of the main flow path 113. The sub-flow path 114 is a flow path for releasing the brake fluid in the wheel cylinder 31 to the master cylinder 22. In the meantime, the sub-flow path 114 may be connected to the master cylinder 22 without through the main flow path 113 (i.e., via a master cylinder port separate from the master cylinder port 111 and via a fluid pipe separate from the fluid pipe 24). Also, the sub-flow path 114 may be connected to the wheel cylinder 31 without through the main flow path 113 (i.e., via a wheel cylinder port separate from the wheel cylinder port 112 and a fluid pipe separate from the fluid pipe 33).

The first hydraulic pressure adjusting valve 121, the second hydraulic pressure adjusting valve 122, the accumulator 123, the check valve 124, and the hydraulic pressure detector 125 are mounted to the base body 110.

The first hydraulic pressure adjusting valve 121 is provided in a region, which is bypassed by the sub-flow path 114, of the main flow path 113. The second hydraulic pressure adjusting valve 122 is provided on the way of the sub-flow path 114. The first hydraulic pressure adjusting valve 121 is an electromagnetic valve that is to be opened in a non-energization state, and is configured not to cut off flowing of the brake fluid in the non-energization state. When the first hydraulic pressure adjusting valve 121 is in an energization state, the first hydraulic pressure adjusting valve 121 is closed to cut off the flowing of the brake fluid. That is, the first hydraulic pressure adjusting valve 121 is a hydraulic pressure adjusting valve configured to open and close the main flow path 113. The second hydraulic pressure adjusting valve 122 is an electromagnetic valve that is to be closed in the non-energization state, and is configured to cut off the flowing of the brake fluid in the non-energization state. When the second hydraulic pressure adjusting valve 122 is in the energization state, the second hydraulic pressure adjusting valve 122 is opened to allow the flowing of the brake fluid. The first hydraulic pressure adjusting valve 121 and the second hydraulic pressure adjusting valve 122 may be configured not to adjust a degree of opening in the opened state or may be configured to adjust a degree of opening in the opened state.

The accumulator 123 is provided downstream of the second hydraulic pressure adjusting valve 122 in the sub-flow path 114. In the accumulator 123, the brake fluid having passed through the second hydraulic pressure adjusting valve 122 is accumulated. In the accumulator 123, an elastic element configured to operate so as to discharge the brake fluid to be introduced therein is embedded. The check valve 124 is provided downstream of the accumulator 123, so that the discharged brake fluid is prevented from returning to the accumulator 123. That is, the brake hydraulic pressure control device 100 of the first embodiment is configured so that when a pressure of the brake fluid in the master cylinder 22 becomes lower than a pressure of the brake fluid accumulated in the accumulator 123, the brake fluid accumulated in the accumulator 123 is to return to the master cylinder 22 in a boost-less manner (i.e., in a pump-less manner).

The hydraulic pressure detector 125 is provided at a position, at which the substantially same hydraulic pressure as the hydraulic pressure of the brake fluid in the wheel cylinder 31 is to be formed, of the internal flow path formed in the base body 110. Meanwhile, in the example of FIG. 1, the flow path 115 is formed at a place, to which an upstream end portion of the sub-flow path 114 is to be connected, of the main flow path 113, and the flow path 115 is provided with the hydraulic pressure detector 125. However, the hydraulic pressure detector 125 may be connected to another place, which is located between the first hydraulic pressure adjusting valve 121 and the wheel cylinder port 112, of the main flow path 113 via or without via the flow path 115. Also, the hydraulic pressure detector 125 may be connected to a place, which is located upstream of the second hydraulic pressure adjusting valve 122, of the sub-flow path 114 via or without via the flow path 115.

The wheel speed detector 126 is to detect a wheel speed of the front wheel 2. The wheel speed detector 126 may be configured to detect the number of rotations of the front wheel 2 or to detect other physical amount that can be converted into the number of rotations of the front wheel 2.

The control unit 130 may be configured by a microcomputer, a microprocessor unit and the like, for example, and include updatable firmware, a program module that is to be executed by a command from a CPU or the like, and the like.

The control unit 130 is configured to control operations of the first hydraulic pressure adjusting valve 121 and the second hydraulic pressure adjusting valve 122 of the brake hydraulic pressure control device 100, thereby controlling a pressure of the brake fluid in the wheel cylinder 31, i.e., a braking force of the front wheel 2.

At this time, the control unit 130 is configured to execute anti-lock brake control and to prevent the front wheel 2 from locking. That is, the control unit 130 is configured to decrease and increase a pressure of the brake fluid in the wheel cylinder 31 and to prevent the front wheel 2 from locking while the brake lever 21 is operated. In the anti-lock brake control that is to be executed by the control unit 130, the time for one opening of the first hydraulic pressure adjusting valve 121 is determined on the basis of a pressure of the brake fluid in the master cylinder 22 and an input gradient, which is an increment per unit time of the amount of operation of the brake lever 21, when increasing the pressure after decreasing the pressure of the brake fluid in the wheel cylinder 31, as described later. The anti-lock brake control that is to be executed by the control unit 130 may be the same as the well-known anti-lock brake control, except the operation of determining the time for one opening of the first hydraulic pressure adjusting valve 121.

For example, when a slip ratio of the front wheel 2 becomes equal to or larger than a first predetermined value while a braking force is generated in the front wheel 2 by a passenger's operation on the brake lever 21, the control unit 130 closes the first hydraulic pressure adjusting valve 121 to cut off the flowing of the brake fluid between the master cylinder 22 and the wheel cylinder 31, thereby preventing the increase in pressure of the brake fluid in the wheel cylinder 31. On the other hand, the control unit 130 opens the second hydraulic pressure adjusting valve 122 to allow the brake fluid to flow from the wheel cylinder 31 to the accumulator 123, thereby decreasing the pressure of the brake fluid in the wheel cylinder 31. Thereby, it is possible to avoid the locking of the front wheel 2 and to prevent the rear wheel from lifting, i.e., so-called rear wheel lifting. At this time, the brake fluid having flowed out from the wheel cylinder 31 is accumulated in the accumulator 123.

Also, for example, when the slip ratio of the front wheel 2 becomes equal to or smaller than a second predetermined value, the control unit 130 closes the second hydraulic pressure adjusting valve 122. Then, the control unit 130 increases the pressure of the brake fluid in the wheel cylinder 31 while repeatedly opening and closing the first hydraulic pressure adjusting valve 121, in other words, repeatedly opening and closing the main flow path 113 by the first hydraulic pressure adjusting valve 121.

In the meantime, in the brake hydraulic pressure control device 100 according to the first embodiment, when the pressure of the brake fluid in the master cylinder 22 becomes lower than the pressure of the brake fluid accumulated in the accumulator 123, the brake fluid accumulated in the accumulator 123 returns to the master cylinder 22 in the boostless manner. That is, in the brake hydraulic pressure control device 100 according to the first embodiment, for example, when the bicycle 1 is stopped, the brake lever 21 is returned and the pressure of the brake fluid in the master cylinder 22 becomes lower than the pressure of the brake fluid accumulated in the accumulator 123, the brake fluid accumulated in the accumulator 123 returns to the master cylinder 22.

<System Configuration of Brake System>

A system configuration of the brake system according to the first embodiment is described.

Figure 2:
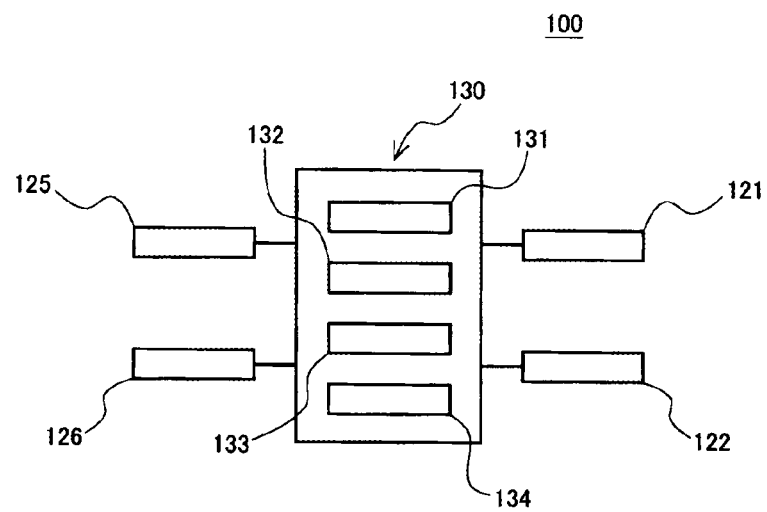
FIG. 2 illustrates an example of a system configuration of the brake system according to the first embodiment of the present invention.

FIG. 2 illustrates an example of a system configuration of the brake system according to the first embodiment of the present invention. Meanwhile, as described above, the anti-lock brake control that is to be executed by the control unit 130 may be the same as the well-known anti-lock brake control, except the operation of determining the time for one opening of the first hydraulic pressure adjusting valve 121 when increasing the pressure after decreasing the pressure of the brake fluid in the wheel cylinder 31. For this reason, in the control unit 130 shown in FIG. 2, only functional units that are to be used when determining the time for one opening of the first hydraulic pressure adjusting valve 121 when increasing the pressure after decreasing the pressure of the brake fluid in the wheel cylinder 31 are shown, and functional units that are responsible for the well-known operations of the anti-lock brake control are not shown.

The control unit 130 includes a master cylinder-side pressure acquisition unit 131, an input gradient acquisition unit 132, an open time determination unit 133, and an execution unit 134.

The master cylinder-side pressure acquisition unit 131 is a functional unit configured to acquire a pressure of the brake fluid in the master cylinder 22. In the first embodiment, the master cylinder-side pressure acquisition unit 131 is configured to obtain the pressure of the brake fluid in the master cylinder 22 by the well-known method of using the wheel speed detector 126 configured to detect a wheel speed of the front wheel 2.

The input gradient acquisition unit 132 is a functional unit configured to acquire an input gradient that is an increment per unit time of the amount of operation (grip amount) of the brake lever 21. The operating amount on the brake lever 21 and the pressure of the brake fluid in the master cylinder 22 have a proportional relation. Also, when the second hydraulic pressure adjusting valve 122 is closed in a state where the first hydraulic pressure adjusting valve 121 is opened, the pressure of the brake fluid in the master cylinder 22 and the pressure of the brake fluid in the wheel cylinder 31 have a proportional relation. For this reason, in the first embodiment, the input gradient acquisition unit 132 is configured to acquire, as the input gradient of the operating amount on the brake lever 21, an increment per unit time of the pressure of the brake fluid in the wheel cylinder 31, which is to be detected by the hydraulic pressure detector 125.

When increasing the pressure of the brake fluid in the wheel cylinder 31 after decreasing the pressure of the brake fluid in the wheel cylinder 31 during the anti-lock brake control, the first hydraulic pressure adjusting valve 121 repeatedly opens and closes the main flow path 113. The open time determination unit 133 is a functional unit configured to determine the time for one opening of the first hydraulic pressure adjusting valve 121 configured to repeatedly open and close the main flow path 113. The open time determination unit 133 is configured to determine the time for one opening of the first hydraulic pressure adjusting valve 121, in correspondence to the pressure of the brake fluid in the master cylinder 22 acquired by the master cylinder-side pressure acquisition unit 131 and the input gradient of the operating amount on the brake lever 21 acquired by the input gradient acquisition unit 132.

The execution unit 134 is a functional unit configured to repeatedly open and close the first hydraulic pressure adjusting valve 121. That is, the execution unit 134 is configured to repeatedly open and close the first hydraulic pressure adjusting valve 121 so that the time for one opening of the first hydraulic pressure adjusting valve 121 is to be the time determined by the open time determination unit 133 when increasing the pressure of the brake fluid in the wheel cylinder 31 after decreasing the pressure of the brake fluid in the wheel cylinder 31 during the anti-lock brake control.

<Control Flow of Brake System>

A control flow of the anti-lock brake control that is to be executed in the brake system of the first embodiment is described. Meanwhile, in the anti-lock brake control that is executed by the brake system 10, a variety of well-known methods can be adopted, in addition to the operation of determining the time for one opening of the first hydraulic pressure adjusting valve 121 when increasing the pressure after decreasing the pressure of the brake fluid in the wheel cylinder 31. For this reason, in the below, a control flow, which determines the time for one opening of the first hydraulic pressure adjusting valve 121 when increasing the pressure after decreasing the pressure of the brake fluid in the wheel cylinder 31, of the anti-lock brake control to be executed in the brake system 10 is described.

Figure 3:
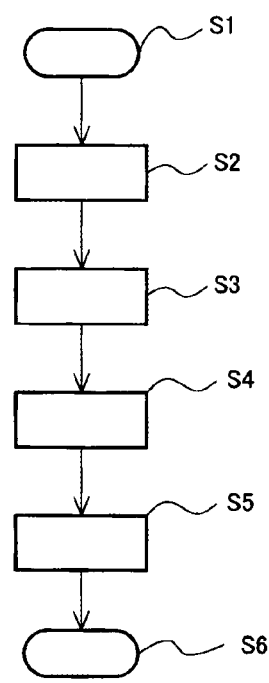
FIG. 3 illustrates an example of a control flow that is to be executed when increasing a pressure after decreasing the pressure of a brake fluid in a wheel cylinder during anti-lock brake control in the brake system according to the first embodiment of the present invention.

FIG. 3 illustrates an example of the control flow of determining the time for one opening of the first hydraulic pressure adjusting valve when increasing the pressure after decreasing the pressure of the brake fluid in the wheel cylinder during the anti-lock brake control in the brake system according to the first embodiment of the present invention. Also, FIG. 4 illustrates a behavior of the bicycle to which the brake system according to the first embodiment of the present invention is mounted, during the anti-lock brake control.

Figure 4:
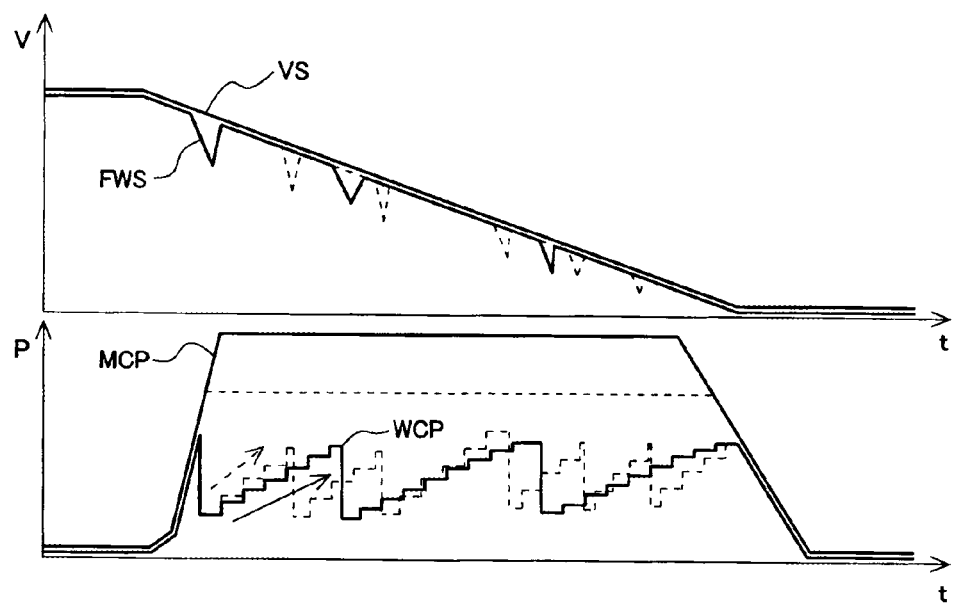
FIG. 4 illustrates a behavior of a bicycle to which the brake system according to the first embodiment of the present invention is mounted, during the anti-lock brake control.

Here, the solid line shown with the reference numeral "VS" in FIG. 4 indicates a vehicle body speed of the bicycle 1. Also, the solid line shown with the reference numeral "FWS" in FIG. 4 indicates a wheel speed of the front wheel 2. Meanwhile, in FIG. 4, the wheel speed of the front wheel of the saddle-type vehicle of the related art configured to execute the anti-lock brake control of the front wheel is shown with the broken line, for reference. Also, the solid line shown with the reference numeral "MCP" in FIG. 4 indicates a pressure of the brake fluid in the master cylinder 22. In the first embodiment, the pressure of the brake fluid in the master cylinder 22 is obtained by a well-known method of using the wheel speed detector 126 configured to detect the wheel speed of the front wheel 2. Meanwhile, in FIG. 4, the pressure of the brake fluid in the master cylinder of the saddle-type vehicle of the related art configured to execute the anti-lock brake control of the front wheel is shown with the broken line, for reference. Also, the solid line shown with the reference numeral "WCP" in FIG. 4 indicates a pressure of the brake fluid in the wheel cylinder 31. The pressure WCP of the brake fluid in the wheel cylinder 31 can be obtained by a well-known method of using the hydraulic pressure detector 125. Meanwhile, in FIG. 4, the pressure of the brake fluid in the wheel cylinder of the saddle-type vehicle of the related art configured to execute the anti-lock brake control of the front wheel is shown with the broken line, for reference.

As shown in FIG. 4, when the brake lever 21 is operated, the pressure MCP of the brake fluid in the master cylinder 22 increases. In this state, the first hydraulic pressure adjusting valve 121 is opened, and the second hydraulic pressure adjusting valve 122 is closed. For this reason, the pressure WCP of the brake fluid in the wheel cylinder 31 also increases. Therefore, the vehicle body speed VS of the bicycle 1 and the wheel speed FWS of the front wheel 2 are decreased by the braking force of the front wheel 2.

For example, when the slip ratio of the front wheel 2 becomes equal to or larger than the first predetermined value, the control unit 130 closes the first hydraulic pressure adjusting valve 121 to cut off the flowing of the brake fluid between the master cylinder 22 and the wheel cylinder 31, thereby preventing the increase in pressure of the brake fluid in the wheel cylinder 31. On the other hand, the control unit 130 opens the second hydraulic pressure adjusting valve 122 to allow the brake fluid to flow from the wheel cylinder 31 to the accumulator 123, thereby decreasing the pressure of the brake fluid in the wheel cylinder 31. Thereby, the locking of the front wheel 2 is avoided. Also, in a state where the decrease in pressure of the brake fluid in the wheel cylinder 31 may be ended during the anti-lock brake control, such as a case where the slip ratio of the front wheel 2 becomes equal to or smaller than the second predetermined value, the control flow shown in FIG. 3 starts.

As shown in FIG. 3, in a state (step S1) where the decrease in pressure of the brake fluid in the wheel cylinder 31 may be ended during the anti-lock brake control, the control unit 130 proceeds to step S2. Step S2 is a master cylinder-side pressure acquisition step of acquiring the pressure of the brake fluid in the master cylinder 22. In step S2, the master cylinder-side pressure acquisition unit 131 acquires a pressure of the brake fluid in the master cylinder 22 by a well-known method of using the wheel speed detector 126 configured to detect a wheel speed of the front wheel 2.

Step S3 after step S2 is an input gradient acquisition step of acquiring an input gradient that is an increment per unit time of the amount of operation (grip amount) of the brake lever 21. The input gradient acquisition unit 132 acquires, as the input gradient for the amount of operation of the brake lever 21, an increment per unit time of the pressure of the brake fluid in the wheel cylinder 31 detected by the hydraulic pressure detector 125.

Step S4 after step S3 is an open time determination step of determining the time for one opening of the first hydraulic pressure adjusting valve 121 when increasing the pressure of the brake fluid in the wheel cylinder 31 after decreasing the pressure of the brake fluid in the wheel cylinder 31 during the anti-lock brake control. In the below, the method of the first embodiment of determining the time for one opening and closing of the first hydraulic pressure adjusting valve 121 is described while comparing the same with a method of the related art of determining the time for one opening and closing of the first hydraulic pressure adjusting valve 121.

A brake hydraulic pressure control device of a saddle-type vehicle of the related art acquires the pressure of the brake fluid in the master cylinder 22 when increasing the pressure after decreasing the pressure of the brake fluid in the wheel cylinder 31 during the anti-lock brake control, like the first embodiment, for example.

The brake hydraulic pressure control device of a saddle-type vehicle of the related art determines the time for one opening of the first hydraulic pressure adjusting valve 121 so that a prescribed amount of the brake fluid is to be supplied to the wheel cylinder 31 during the time for one opening of the first hydraulic pressure adjusting valve 121, based on the acquired pressure of the brake fluid in the master cylinder 22. For example, the brake hydraulic pressure control device of a saddle-type vehicle of the related art obtains a differential pressure by subtracting a pressure of the brake fluid in the wheel cylinder 31 at the present moment from the acquired pressure of the brake fluid in the master cylinder 22. Then, the brake hydraulic pressure control device of a saddle-type vehicle of the related art determines how long the first hydraulic pressure adjusting valve 121 is to be opened at the differential pressure so as to supply the prescribed amount of the brake fluid to the wheel cylinder 31, thereby determining the time for one opening of the first hydraulic pressure adjusting valve 121.

If the time for one opening of the first hydraulic pressure adjusting valve 121 is determined in this way, when the decrease in pressure of the brake fluid in the wheel cylinder 31 starts during the anti-lock brake control while the operating amount on the brake lever 21 is increasing (for example, while the brake lever 21 is being gripped), for example, the acquired pressure of the brake fluid in the master cylinder 22 may be lower than an actual pressure of the brake fluid in the master cylinder 22 at the time when opening the first hydraulic pressure adjusting valve 121 upon the increase in pressure.

In this case, an actual differential pressure between the actual pressure of the brake fluid in the master cylinder 22 and the pressure of the brake fluid in the wheel cylinder 31 is larger than the differential pressure obtained as described above. For this reason, a brake fluid more than the prescribed amount is supplied to the wheel cylinder 31 during the time for one opening of the first hydraulic pressure adjusting valve 121. Therefore, when increasing the pressure of the brake fluid in the wheel cylinder 31 while repeatedly opening and closing the first hydraulic pressure adjusting valve 121 after decreasing the pressure of the brake fluid in the wheel cylinder 31 during the anti-lock brake control, a gradient of the increase in pressure of the brake fluid in the wheel cylinder 31 increases, as shown with the broken arrow in FIG. 4. That is, the pressure of the brake fluid in the wheel cylinder 31 rapidly increases. Then, the front wheel 2 locks, so that the rear wheel lifts.

On the other hand, in step S4, the open time determination unit 133 of the control unit 130 according to the first embodiment determines the time for one opening of the first hydraulic pressure adjusting valve 121, in correspondence to the pressure of the brake fluid in the master cylinder 22 acquired by the master cylinder-side pressure acquisition unit 131 and the input gradient of the operating amount on the brake lever 21 acquired by the input gradient acquisition unit 132. Specifically, the open time determination unit 133 determines the time for one opening of the first hydraulic pressure adjusting valve 121, as follows.

Figure 5:
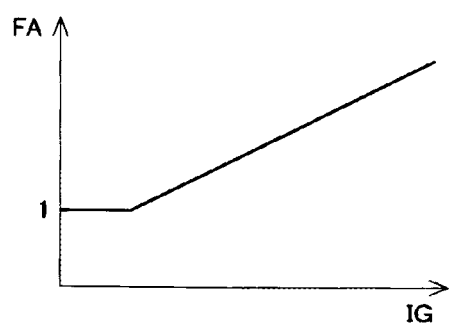
FIG. 5 illustrates a relation between an input gradient IG of an operating amount on a brake lever and a first coefficient FA in the brake system according to the first embodiment of the present invention.

FIG. 5 illustrates a relation between an input gradient IG of the operating amount on the brake lever and a first coefficient FA in the brake system according to the first embodiment of the present invention. As shown in FIG. 5, the larger the input gradient IG of the operating amount on the brake lever 21 is, the larger the first coefficient FA is.

The open time determination unit 133 has a table and the like by which it is possible to deduce the relation shown in FIG. 5 between the input gradient IG and the first coefficient FA. The open time determination unit 133 multiplies the pressure of the brake fluid in the master cylinder 22 acquired by the master cylinder-side pressure acquisition unit 131 by the first coefficient FA. Then, the open time determination unit 133 determines the time for one opening of the first hydraulic pressure adjusting valve 121 on the basis of the pressure of the brake fluid in the master cylinder 22 multiplied by the first coefficient FA so that the prescribed amount of the brake fluid is to be supplied to the wheel cylinder 31 during the time for one opening of the first hydraulic pressure adjusting valve 121.

For example, the open time determination unit 133 subtracts the pressure of the brake fluid in the wheel cylinder 31 at the present moment from the pressure of the brake fluid in the master cylinder 22 multiplied by the first coefficient FA, thereby obtaining a differential pressure. Then, the open time determination unit 133 determines how long the first hydraulic pressure adjusting valve 121 is to be opened at the differential pressure so as to supply the prescribed amount of the brake fluid to the wheel cylinder 31, thereby determining the time for one opening of the first hydraulic pressure adjusting valve 121.

As the input gradient IG of the operating amount on the brake lever 21 becomes larger, the differential pressure between the pressure of the brake fluid in the master cylinder 22 acquired by the master cylinder-side pressure acquisition unit 131 and the pressure of the brake fluid in the master cylinder 22 at the present moment at which the time for one opening of the first hydraulic pressure adjusting valve 121 is to be determined increases. That is, when the time for one opening of the first hydraulic pressure adjusting valve 121 is determined using the pressure of the brake fluid in the master cylinder 22 acquired by the master cylinder-side pressure acquisition unit 131, like the related art, as the input gradient IG of the operating amount on the brake lever 21 becomes larger, a supply amount of the brake fluid to the wheel cylinder 31 during the time for one opening of the first hydraulic pressure adjusting valve 121 increases. Therefore, when the time for one opening of the first hydraulic pressure adjusting valve 121 is determined using the pressure of the brake fluid in the master cylinder 22 acquired by the master cylinder-side pressure acquisition unit 131, like the related art, as the input gradient IG of the operating amount on the brake lever 21 becomes larger, the pressure of the brake fluid in the wheel cylinder 31 rapidly increases, so that the rear wheel lifting is likely to occur.

In contrast, according to the first embodiment, the time for one opening of the first hydraulic pressure adjusting valve 121 is determined using the pressure of the brake fluid in the master cylinder 22 multiplied by the first coefficient FA. The first coefficient FA becomes larger as the input gradient IG of the operating amount on the brake lever 21 becomes larger. For this reason, the pressure of the brake fluid in the master cylinder 22 multiplied by the first coefficient FA also increases as the input gradient IG of the operating amount on the brake lever increases. In other words, a state where the input gradient IG of the operating amount on the brake lever 21 is a first input gradient is referred to as a first input gradient state. Also, a state where the input gradient IG of the operating amount on the brake lever 21 is a second input gradient larger than the first input gradient is referred to as a second input gradient state. When comparing the first input gradient state and the second input gradient state, the time for one opening of the first hydraulic pressure adjusting valve 121 in the second input gradient state is shorter than the time for one opening of the first hydraulic pressure adjusting valve 121 in the first input gradient state under conditions where the pressure of the brake fluid in the master cylinder 22 acquired by the master cylinder-side pressure acquisition unit 131 is constant.

Therefore, the differential pressure between the pressure of the brake fluid in the master cylinder 22 multiplied by the first coefficient FA and the pressure of the brake fluid in the master cylinder 22 at the present moment at which the time for one opening of the first hydraulic pressure adjusting valve 121 is to be determined is smaller than the differential pressure between the pressure of the brake fluid in the master cylinder 22 acquired by the master cylinder-side pressure acquisition unit 131 and the pressure of the brake fluid in the master cylinder 22 at the present moment at which the time for one opening of the first hydraulic pressure adjusting valve 121 is to be determined.

For this reason, when the time for one opening of the first hydraulic pressure adjusting valve 121 is determined, like the first embodiment, an amount of the brake fluid to be supplied to the wheel cylinder 31 during the time for one opening of the first hydraulic pressure adjusting valve 121 can be made closer to the prescribed amount, as compared to the related art. Therefore, the time for one opening of the first hydraulic pressure adjusting valve 121 is determined, like the first embodiment, so that when the pressure of the brake fluid in the wheel cylinder 31 is increased while repeatedly opening and closing the first hydraulic pressure adjusting valve 121, like step S5 (which will be described later), after decreasing the pressure of the brake fluid in the wheel cylinder 31 during the anti-lock brake control, the gradient of the increase in pressure of the brake fluid in the wheel cylinder 31 becomes smaller than that in the related art, as shown with the solid arrow in FIG. 4. For this reason, the time for one opening of the first hydraulic pressure adjusting valve 121 is determined, like the first embodiment, so that it is possible to prevent the pressure of the brake fluid in the wheel cylinder 31 from rapidly increasing and to prevent the front wheel 2 from locking to cause the rear wheel lifting.

Meanwhile, in FIG. 5, the value of the first coefficient FA is 1 in a range within which the input gradient IG of the operating amount on the brake lever 21 is smaller than a predetermined value. The range in which the value of the first coefficient FA is 1 is a range in which the differential pressure between the pressure of the brake fluid in the master cylinder 22 acquired by the master cylinder-side pressure acquisition unit 131 and the pressure of the brake fluid in the master cylinder 22 at the present moment at which the time for one opening of the first hydraulic pressure adjusting valve 121 is to be determined is small and it is not necessary to amend the pressure of the brake fluid in the master cylinder 22 acquired by the master cylinder-side pressure acquisition unit 131 with the first coefficient FA.

Step S5 after step S4 is an execution step of opening and closing the first hydraulic pressure adjusting valve 121. That is, when increasing the pressure of the brake fluid in the wheel cylinder 31 after decreasing the pressure of the brake fluid in the wheel cylinder 31 during the anti-lock brake control, the execution unit 134 repeatedly opens and closes the first hydraulic pressure adjusting valve 121 so that the time for one opening of the first hydraulic pressure adjusting valve 121 is to be the time determined by the open time determination unit 133.

When increasing the pressure of the brake fluid in the wheel cylinder 31 while repeatedly opening and closing the first hydraulic pressure adjusting valve 121 in step S5, if the slip ratio of the front wheel 2 becomes equal to or larger than the first predetermined value, for example, the operation of decreasing the pressure of the brake fluid in the wheel cylinder 31 during the anti-lock brake control is again executed. That is, after the brake lever 21 is operated until the operation is over, a second operation of decreasing the pressure of the brake fluid in the wheel cylinder 31 is executed. In this state, the process proceeds to step S6 and the control flow shown in FIG. 3 is over.

In the meantime, after the second operation of decreasing the pressure of the brake fluid in the wheel cylinder 31, when the slip ratio of the front wheel 2 becomes equal to or smaller than the second predetermined value, for example, a second operation of increasing the pressure of the brake fluid in the wheel cylinder 31 during the anti-lock brake control is again executed. Then, after the brake lever 21 is operated until the operation is over, the operations of decreasing and increasing the pressure of the brake fluid in the wheel cylinder 31 are repeatedly executed, as required. At this time, in the second and next operations of increasing the pressure of the brake fluid in the wheel cylinder 31, the execution unit 134 repeatedly opens and closes the first hydraulic pressure adjusting valve 121 so that the time for one opening of the first hydraulic pressure adjusting valve 121 is to be the open time determined as described above before starting the first pressure increasing operation. Of course, the time for one opening of the first hydraulic pressure adjusting valve 121 may be determined before each operation of increasing the pressure of the brake fluid in the wheel cylinder 31 is executed.

<Effects>

The brake hydraulic pressure control device 100 according to the first embodiment executes the anti-lock brake control of decreasing and increasing the pressure of the brake fluid in the wheel cylinder 31, in correspondence to the slip state of the front wheel 2 while the brake lever 21 is operated. Also, the brake hydraulic pressure control device 100 according to the first embodiment includes the master cylinder-side pressure acquisition unit 131, the input gradient acquisition unit 132, the open time determination unit 133, and the execution unit 134. The master cylinder-side pressure acquisition unit 131 is configured to acquire the pressure of the brake fluid in the master cylinder 22. The input gradient acquisition unit 132 is configured to acquire the input gradient that is an increment per unit time of the amount of operation of the brake lever 21. The open time determination unit 133 is configured to determine the time for one opening of the first hydraulic pressure adjusting valve 121 during which the main flow path 113, through which the brake fluid to be supplied from the master cylinder 22 to the wheel cylinder 31 is to flow, is to be repeatedly opened and closed when increasing the pressure of the brake fluid in the wheel cylinder 31 after decreasing the pressure of the brake fluid in the wheel cylinder 31 during the anti-lock brake control. The execution unit 134 is configured to open and close the first hydraulic pressure adjusting valve 121. The open time determination unit 133 is configured to determine the time for one opening of the first hydraulic pressure adjusting valve 121, in correspondence to the pressure of the brake fluid in the master cylinder 22 and the input gradient of the operating amount on the brake lever 21.

The brake hydraulic pressure control device 100 according to the first embodiment determines the time for one opening of the first hydraulic pressure adjusting valve 121 when increasing the pressure after decreasing the pressure of the brake fluid in the wheel cylinder 31 during the anti-lock brake control, based on the pressure of the brake fluid in the master cylinder 22 and the input gradient, which is an increment per unit time of the amount of operation of the input unit of the brake lever 21. For this reason, the brake hydraulic pressure control device 100 according to the first embodiment can prevent more than the prescribed amount of the brake fluid from being supplied to the wheel cylinder 31 during the time for one opening of the first hydraulic pressure adjusting valve 121, as compared to the related art, and can thus prevent the pressure of the brake fluid in the wheel cylinder 31 from rapidly increasing. Therefore, the brake hydraulic pressure control device 100 according to the first embodiment can prevent the rear wheel lifting, in contrast to the related art.

Modified Embodiments

In the first embodiment, the open time determination unit 133 of the control unit 130 multiplies the pressure of the brake fluid in the master cylinder 22, which is acquired by the master cylinder-side pressure acquisition unit 131, by the first coefficient FA. Then, the open time determination unit 133 determines the time for one opening of the first hydraulic pressure adjusting valve 121, based on the pressure of the brake fluid in the master cylinder 22 multiplied by the first coefficient FA. However, the present invention is not limited thereto, and the open time determination unit 133 may be configured to determine the time for one opening of the first hydraulic pressure adjusting valve 121, in correspondence to the pressure of the brake fluid in the master cylinder 22 acquired by the master cylinder-side pressure acquisition unit 131 and the input gradient of the operating amount on the brake lever 21 acquired by the input gradient acquisition unit 132. For example, the open time determination unit 133 may be configured to acquire the time for one opening of the first hydraulic pressure adjusting valve 121, based on the pressure of the brake fluid in the master cylinder 22 acquired by the master cylinder-side pressure acquisition unit 131, like the related art. Then, the open time determination unit 133 may be configured to multiply the acquired time for one opening of the first hydraulic pressure adjusting valve 121 by the first coefficient FA and to determine a resultant value, as the time for one opening of the first hydraulic pressure adjusting valve 121. Even though the time for one opening of the first hydraulic pressure adjusting valve 121 is determined in this way, when increasing the pressure after decreasing the pressure of the brake fluid in the wheel cylinder 31 during the anti-lock brake control, it is possible to prevent the pressure of the brake fluid in the wheel cylinder 31 from rapidly increasing, so that it is possible to prevent the rear wheel lifting.

As the brake hydraulic pressure control device of the related art configured to execute the anti-lock brake control, there is one including a pump configured to return the brake fluid accumulated in the accumulator to the master cylinder. The brake hydraulic pressure control device 100 of the first embodiment may include such a pump.

Also, the detector provided to the brake hydraulic pressure control device 100 of the first embodiment is just exemplary. In the related art, as the method of acquiring the wheel speed of the front wheel 2, the pressure of the brake fluid in the master cylinder 22, the pressure of the brake fluid in the wheel cylinder 31 and the like, a variety of methods of using diverse detectors have been known. By the variety of methods of using the diverse detectors, the vehicle body speed of the bicycle 1, the pressure of the brake fluid in the master cylinder 22, the pressure of the brake fluid in the wheel cylinder 31 and the like may be acquired.

Also, in the first embodiment, the brake hydraulic pressure control device 100 is used to control the braking force of the front wheel 2 of the bicycle 1. However, the present invention is not limited thereto. For example, the brake hydraulic pressure control device 100 may be used to control the braking force of a wheel, other than the front wheel 2 of the bicycle 1. Also, when the brake hydraulic pressure control device 100 is used to control the braking forces of a plurality of wheels of the bicycle 1, the different brake hydraulic pressure control devices 100 may be connected to each wheel cylinder of each wheel or the wheel cylinders of at least two wheels may be connected to the same brake hydraulic pressure control device 100.

Also, as described above, the saddle-type vehicle for which the brake hydraulic pressure control device 100 is adopted is not limited to the bicycle 1. The brake hydraulic pressure control device 100 may be adopted for other saddle-type vehicles rather than the bicycle 1.

Second Embodiment

The brake hydraulic pressure control device 100 of the first embodiment may be added with a vehicle body speed acquisition unit 135 as described below. In the meantime, it is assumed that the items not described in a second embodiment are the same as the first embodiment.

Figure 6:
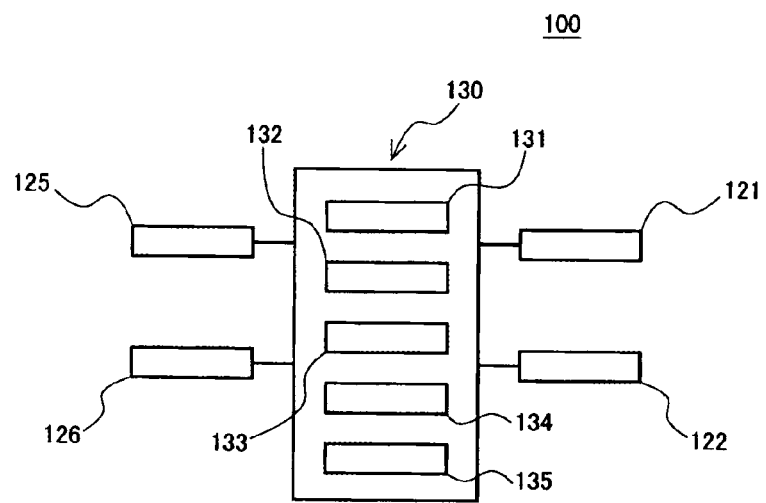
FIG. 6 illustrates an example of a system configuration of a brake system according to a second embodiment of the present invention.

FIG. 6 illustrates an example of a system configuration of a brake system according to the second embodiment of the present invention. The control unit 130 of the brake hydraulic pressure control device 100 according to the second embodiment includes a vehicle body speed acquisition unit 135, in addition to the configuration described in the first embodiment. The vehicle body speed acquisition unit 135 is a functional unit configured to acquire a vehicle body speed of the bicycle 1. The method of acquiring the vehicle body speed of the bicycle 1 is not particularly limited. However, the vehicle body speed acquisition unit 135 of the second embodiment is configured to obtain a vehicle body speed of the bicycle 1 by a well-known method of using the wheel speed detector 126 configured to detect a wheel speed of the front wheel 2.

Also, in step S4 shown in FIG. 3, the control unit 130 of the second embodiment determines the time for one opening of the first hydraulic pressure adjusting valve 121, in correspondence to the pressure of the brake fluid in the master cylinder 22 acquired by the master cylinder-side pressure acquisition unit 131, the input gradient of the operating amount on the brake lever 21 acquired by the input gradient acquisition unit 132, and the vehicle body speed of the bicycle 1 acquired by the vehicle body speed acquisition unit 135. Specifically, the open time determination unit 133 determines the time for one opening of the first hydraulic pressure adjusting valve 121, as follows.

Figure 7:
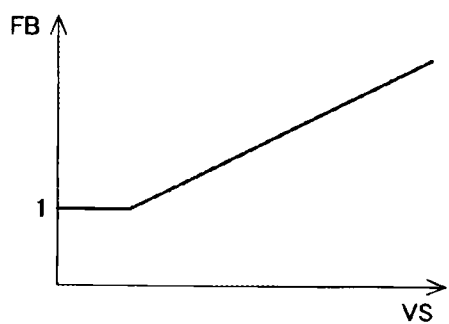
FIG. 7 illustrates a relation between a bicycle vehicle body speed VS and a second coefficient FB in the brake system according to the second embodiment of the present invention.

FIG. 7 illustrates a relation between a bicycle vehicle body speed VS and a second coefficient FB in the brake system according to the second embodiment of the present invention. As shown in FIG. 7, the higher the vehicle body speed VS of the bicycle 1 is, the larger the second coefficient FB is.

The open time determination unit 133 of the second embodiment has a table and the like by which it is possible to deduce the relation shown in FIG. 7 between the vehicle body speed VS of the bicycle 1 and the second coefficient FB. The open time determination unit 133 is configured to multiply the pressure of the brake fluid in the master cylinder 22, which is acquired by the master cylinder-side pressure acquisition unit 131, by the first coefficient FA and the second coefficient FB. Then, the open time determination unit 133 is configured to determine the time for one opening of the first hydraulic pressure adjusting valve 121 so that the prescribed amount of the brake fluid is to be supplied to the wheel cylinder 31 during the time for one opening of the first hydraulic pressure adjusting valve 121, based on the pressure of the brake fluid in the master cylinder 22 multiplied by the first coefficient FA and the second coefficient FB.

For example, the open time determination unit 133 is configured to obtain a differential pressure by subtracting the pressure of the brake fluid in the wheel cylinder 31 at the present moment from the pressure of the brake fluid in the master cylinder 22 multiplied by the first coefficient FA and the second coefficient FB. Then, the open time determination unit 133 is configured to determine how long the first hydraulic pressure adjusting valve 121 is to be opened at the differential pressure so as to supply the prescribed amount of the brake fluid to the wheel cylinder 31, thereby determining the time for one opening of the first hydraulic pressure adjusting valve 121.

The higher the vehicle body speed VS of the bicycle 1 is, the larger the second coefficient FB is. For this reason, in the second embodiment, the higher the vehicle body speed VS of the bicycle 1 is, the shorter the time for one opening of the first hydraulic pressure adjusting valve 121 is and the smaller the amount of the brake fluid is, which is to be supplied to the wheel cylinder 31 during the time for one opening of the first hydraulic pressure adjusting valve 121. In other words, a state where the vehicle body speed VS of the bicycle 1 is a first vehicle body speed is referred to as a first speed state. Also, a state where the vehicle body speed VS of the bicycle 1 is a second vehicle body speed higher than the first vehicle body speed is referred to as a second speed state. When comparing the first speed state and the second speed state, the time for one opening of the first hydraulic pressure adjusting valve 121 in the second speed state is shorter than the time for one opening of the first hydraulic pressure adjusting valve 121 in the first speed state under conditions where the pressure of the brake fluid in the master cylinder 22 acquired by the master cylinder-side pressure acquisition unit 131 is constant and the input gradient IG of the operating amount on the brake lever 21 is constant. That is, in the second embodiment, when the pressure of the brake fluid in the wheel cylinder 31 is increased while the first hydraulic pressure adjusting valve 121 is repeatedly opened and closed after the pressure of the brake fluid in the wheel cylinder 31 is decreased during the anti-lock brake control, as the vehicle body speed VS of the bicycle 1 increases, the gradient of the increase in pressure of the brake fluid in the wheel cylinder 31 decreases.

Depending on the specification and the like of the bicycle 1, when the vehicle body speed VS of the bicycle 1 increases, the rear wheel lifting is more likely to occur. However, when the time for one opening of the first hydraulic pressure adjusting valve 121 is set as described in the second embodiment, as the vehicle body speed VS of the bicycle 1 increases, the gradient of the increase in pressure of the brake fluid in the wheel cylinder 31 decreases. Therefore, even when the vehicle body speed VS of the bicycle 1 increases, it is possible to prevent the rear wheel from lifting.

Also, the brake hydraulic pressure control device 100 of the second embodiment has such a configuration that the brake fluid accumulated in the accumulator 123 is to return to the master cylinder 22 in the boost-less manner, like the first embodiment. In the brake hydraulic pressure control device 100 configured in this way, the time for one opening of the first hydraulic pressure adjusting valve 121 is set as described in the second embodiment, so that following effects can be accomplished.

Specifically, in the brake hydraulic pressure control device 100 configured to return the brake fluid accumulated in the accumulator 123 to the master cylinder 22 in the boost-less manner, when the bicycle 1 is stopped, the brake lever 21 is returned (after the operation on the brake lever 21 is over) and the pressure of the brake fluid in the master cylinder 22 becomes lower than the pressure of the brake fluid accumulated in the accumulator 123, the brake fluid accumulated in the accumulator 123 returns to the master cylinder 22.

For this reason, while the brake lever 21 is operated, the brake hydraulic pressure control device 100 cannot return the brake fluid accumulated in the accumulator 123 to the master cylinder 22. Also, whenever the pressure of the brake fluid in the wheel cylinder 31 is decreased during the anti-lock brake control, the amount of the brake fluid accumulated in the accumulator 123 increases. For this reason, in the brake hydraulic pressure control device 100 of the second embodiment, when the number of times of the operations of decreasing and increasing the pressure of the brake fluid in the wheel cylinder 31 is large, it is concerned that the accumulator 123 will be full of the brake fluid after the brake lever 21 is operated until the operation is released. That is, it is concerned that the accumulator 123 will be full of the brake fluid, so that the pressure of the brake fluid in the wheel cylinder 31 cannot be decreased during the anti-lock brake control and the front wheel 2 will thus lock.

Here, the higher the vehicle body speed VS of the bicycle 1 is, the more time is required until the bicycle 1 is to stop, so that the number of times of the operations of decreasing and increasing the pressure of the brake fluid in the wheel cylinder 31 is likely to increase. That is, the higher the vehicle body speed VS of the bicycle 1 is, the accumulator 123 is more likely to be full of the brake fluid. However, when the time for one opening of the first hydraulic pressure adjusting valve 121 is determined as described in the second embodiment, the higher the vehicle body speed VS of the bicycle 1 is, the smaller the gradient of the increase in pressure of the brake fluid in the wheel cylinder 31 is. For this reason, even when the vehicle body speed VS of the bicycle 1 increases, it is possible to prevent the number of times of the operations of decreasing and increasing the pressure of the brake fluid in the wheel cylinder 31 from increasing. Therefore, when the time for one opening of the first hydraulic pressure adjusting valve 121 is determined as described in the second embodiment, it is possible to prevent the accumulator 123 from being full of the brake fluid, so that it is possible to prevent the front wheel 2 from locking.

Meanwhile, in FIG. 7, the value of the second coefficient FB is 1 in a range within which the vehicle body speed VS of the bicycle 1 is smaller than a predetermined value. The range in which the value of the second coefficient FB is 1 is a range in which the differential pressure between the pressure of the brake fluid in the master cylinder 22 acquired by the master cylinder-side pressure acquisition unit 131 and the pressure of the brake fluid in the master cylinder 22 at the present moment at which the time for one opening of the first hydraulic pressure adjusting valve 121 is to be determined is small and it is not necessary to amend the pressure of the brake fluid in the master cylinder 22 acquired by the master cylinder-side pressure acquisition unit 131 with the second coefficient FB.

Here, the method of determining the time for one opening of the first hydraulic pressure adjusting valve 121 according to the second embodiment is illustrative only. For example, the open time determination unit 133 may be configured to acquire the time for one opening of the first hydraulic pressure adjusting valve 121, like the first embodiment. The open time determination unit 133 may be configured to multiply the acquired time for one opening of the first hydraulic pressure adjusting valve 121 by the second coefficient FB and to determine a resultant value, as the time for one opening of the first hydraulic pressure adjusting valve 121.

REFERENCE SIGNS LIST

1: Bicycle (saddle-type vehicle)
2: Front wheel
10: Brake system
20: Braking operation unit
21: Brake lever (input unit)
22: Master cylinder
23: Reservoir
24: Fluid pipe
30: Front wheel braking unit
31: Wheel cylinder 32: Brake disc
33: Fluid pipe
100: Brake hydraulic pressure control device
110: Base body
111: Master cylinder port
112: Wheel cylinder port
113: Main flow path
114: Sub-flow path
115: Flow path
121: First hydraulic pressure adjusting valve
122: Second hydraulic pressure adjusting valve
123: Accumulator
124: Check valve
125: Hydraulic pressure detector
126: Wheel speed detector
130: Control unit
131: Master cylinder-side pressure acquisition unit
132: Input gradient acquisition unit
133: Open time determination unit
134: Execution unit
135: Vehicle body speed acquisition unit

The invention claimed is:

1. A brake hydraulic pressure control device (100) of a saddle-type vehicle, configured to execute anti-lock brake control of decreasing and increasing a pressure of a brake fluid in a wheel cylinder (31) in correspondence to a slip state of a wheel (2) while a brake lever (21) of a brake is operated, the brake hydraulic pressure control device (100) comprising:
an electronic processor configured to:
acquire a pressure of a brake fluid in a master cylinder (22);
acquire an input gradient, which is an increment per unit time of an amount of operation of the brake lever (21);
determine an opening time of one opening of a hydraulic pressure adjusting valve (121); and
control the hydraulic pressure adjusting valve (121) to repeatedly open for the opening time and close a main flow path (113), causing a brake fluid to flow from the master cylinder (22) to the wheel cylinder (31),
wherein a pressure of the brake fluid in the wheel cylinder (31) is increased after a decrease in the pressure of the brake fluid in the wheel cylinder (31) during the anti-lock brake control, and
the electronic processor is configured to determine the opening time according to the pressure of the brake fluid in the master cylinder (22) and the input gradient of the brake lever (21).

2. The brake hydraulic pressure control device (100) according to claim 1, wherein the electronic processor is configured to
determine the opening time such that, in a second input gradient state, the opening time is shorter than an opening time in a first input gradient state when the pressure of the brake fluid in the master cylinder (22) is constant,
wherein the first input gradient state is defined by a first input gradient of the brake lever,
the second input gradient state is defined by a second input gradient of the brake lever, and
the second input gradient is larger than the first input gradient.

3. The brake hydraulic pressure control device (100) according to claim 1, wherein the electronic processor is further configured to acquire a vehicle body speed of the saddle-type vehicle, and
and determine the opening time based on the pressure of the brake fluid in the master cylinder (22), the input gradient of the brake lever (21) and the vehicle body speed of the saddle-type vehicle.

4. The brake hydraulic pressure control device (100) according to claim 3, wherein when a first speed state in which the vehicle body speed of the saddle-type vehicle is a first vehicle body speed is compared with a second speed state in which the vehicle body speed of the saddle-type vehicle is a second vehicle body speed higher than the first vehicle body speed, the opening time in the second speed state is shorter than the opening time in the first speed state under a condition where the pressure of the brake fluid in the master cylinder (22) is constant and the input gradient of the brake lever (21) is constant.

5. The brake hydraulic pressure control device (100) according to claim 3, further comprising an accumulator (123) configured to accumulate therein a brake fluid released from the wheel cylinder (31) during the anti-lock brake control,
wherein after an operation on the brake lever (21) is over, the brake fluid in the accumulator (123) is returned to the master cylinder (22) in a boost-less manner.

6. A saddle-type vehicle comprising the brake hydraulic pressure control device (100) according to claim 1.

7. The saddle-type vehicle according to claim 6, which is an electric saddle-type vehicle.

8. The saddle-type vehicle according to claim 6, which is a motorcycle.

9. The saddle-type vehicle according to claim 6, which is a bicycle (1).

10. A method for controlling brake hydraulic pressure in a saddle-type vehicle to execute anti-lock brake control of decreasing and increasing a pressure of a brake fluid in a wheel cylinder (31) in correspondence to a slip state of a wheel (2) while an brake lever (21) of a brake is operated, the method comprising:
a master cylinder-side pressure acquisition step (S2) of acquiring a pressure of a brake fluid in a master cylinder (22);
an input gradient acquisition step (S3) of acquiring an input gradient, which is an increment per unit time of an amount of operation of the brake lever (21);
an open time determination step (S4) of determining an opening time of one opening of a hydraulic pressure adjusting valve (121); and
an execution step (S5) of opening, of the opening time, and closing the hydraulic pressure adjusting valve (121), causing a brake fluid to flow from the master cylinder (22) to the wheel cylinder (31),
wherein a pressure of the brake fluid in the wheel cylinder (31) is increased after a decrease in the pressure of the brake fluid in the wheel cylinder (31) during the anti-lock brake control, and
wherein in the open time determination step (S4), the opening time is determined based on the pressure of the brake fluid in the master cylinder (22) and the input gradient of the brake lever (21).

* * * * *